(12) United States Patent
Suh et al.

(10) Patent No.: US 10,444,787 B2
(45) Date of Patent: Oct. 15, 2019

(54) DATA COMMUNICATION DEVICE

(71) Applicant: SAMSUNG ELECTRONICS CO., LTD., Suwon-si (KR)

(72) Inventors: Yunjae Suh, Suwon-si (KR); Moradi Saber, Suwon-si (KR); Junseok Kim, Hwaseong-si (KR); Sung Ho Kim, Yongin-si (KR); Eric Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 435 days.

(21) Appl. No.: 15/203,967

(22) Filed: Jul. 7, 2016

(65) Prior Publication Data
US 2017/0168521 A1    Jun. 15, 2017

(30) Foreign Application Priority Data
Dec. 10, 2015  (KR) ......................... 10-2015-0176234

(51) Int. Cl.
*G06F 1/12* (2006.01)

(52) U.S. Cl.
CPC ..................................... *G06F 1/12* (2013.01)

(58) Field of Classification Search
USPC ........... 341/70; 365/72; 370/395.6; 382/124; 711/67
See application file for complete search history.

(56) References Cited

U.S. PATENT DOCUMENTS

| | | | |
|---|---|---|---|
| 6,008,746 A * | 12/1999 | White | H04L 25/4904 341/70 |
| 6,660,989 B2 | 12/2003 | Guo et al. | |
| 7,280,544 B2 * | 10/2007 | Tsai | H04Q 11/0478 370/395.6 |
| 7,795,985 B2 * | 9/2010 | Roithmeier | H03J 3/04 331/1 A |
| 8,266,405 B2 * | 9/2012 | Khodabandehlou | G11C 7/1045 711/167 |
| 8,426,793 B1 | 4/2013 | Barrows | |
| 8,780,240 B2 | 7/2014 | Posch et al. | |
| 9,055,242 B2 | 6/2015 | Kim et al. | |

(Continued)

FOREIGN PATENT DOCUMENTS

| | | |
|---|---|---|
| JP | 2006-101171 A | 4/2006 |
| JP | 2013-546064 A | 12/2013 |

(Continued)

OTHER PUBLICATIONS

Leo Lee et al., "Dynamic bootstrapped shift register for smart sensor arrays", Institute of Physics Publishing, Smart Materials and Structures, Smart Mater. Struct. 14 (2005) (6 Pages Total), doi: 10.1088/0964-1726/14/4/015.

(Continued)

*Primary Examiner* — Xuemei G Chen
(74) *Attorney, Agent, or Firm* — Sughrue Mion, PLLC

(57) ABSTRACT

A data communication device is provided. The data communication device includes a data array configured to receive pieces of data, register cells, each register cell of the registers cells being configured to be activated based on a respective one of the pieces of data, and an outputter configured to output information corresponding to a register cell that is activated among the register cells.

9 Claims, 12 Drawing Sheets

(56) References Cited

U.S. PATENT DOCUMENTS

| | | |
|---|---|---|
| 9,075,724 B2 | 7/2015 | Isherwood et al. |
| 9,455,002 B2 * | 9/2016 | Kim .................... G11C 7/08 |
| 2003/0081134 A1 | 5/2003 | Luo et al. |
| 2005/0273661 A1 | 12/2005 | Brajovic |
| 2009/0009618 A1 | 1/2009 | Hasegawa et al. |
| 2011/0106741 A1 | 5/2011 | Denneau et al. |
| 2013/0100147 A1 | 4/2013 | Rao et al. |
| 2014/0125994 A1 | 5/2014 | Kim et al. |
| 2015/0069218 A1 | 3/2015 | Cho et al. |
| 2015/0262635 A1 * | 9/2015 | Joo ................. G11C 7/1087 365/72 |
| 2015/0285625 A1 * | 10/2015 | Deane ................ G01S 17/10 348/140 |
| 2016/0042216 A1 * | 2/2016 | Yang ................. G06K 9/0002 382/124 |

FOREIGN PATENT DOCUMENTS

| | | |
|---|---|---|
| KR | 10-2012-0136015 A | 12/2012 |
| KR | 10-2013-0013014 A | 2/2013 |
| KR | 10-2014-0132787 A | 11/2014 |
| WO | 2012/055592 A1 | 5/2012 |

OTHER PUBLICATIONS

Lichtsteiner et al., "A 128×128 120 dB 15 μs Latency Asynchronous Temporal Contrast Vision Sensor", IEEE Journal of Solid-State Circuits, vol. 43, No. 2, Feb. 2008, pp. 566-576 (11 pages total).
Brandli et al., "A 240×180 130 dB 3 μs Latency Global Shutter Spatiotemporal Vision Sensor", IEEE Journal of Solid-State Circuits, vol. 49, No. 10, Oct. 2014, pp. 2333-2341(9 pages total).

\* cited by examiner

DATA COMMUNICATION DEVICE

CROSS-REFERENCE TO RELATED APPLICATION(S)

This application claims priority from Korean Patent Application No. 10-2015-0176234, filed on Dec. 10, 2015, in the Korean Intellectual Property Office, the disclosure of which is incorporated herein by reference in its entirety.

BACKGROUND

1. Field

Methods and apparatuses consistent with example embodiments relate to a data communication device.

2. Description of the Related Art

A sensor including a plurality of elements may include a detector configured to detect a signal in each element, an analog circuit configured to amplify the signal detected by the detector, and a digital circuit configured to process the amplified signal.

In the sensor including the elements, data may not be equally generated in the elements at a location, but may be randomly generated depending on a usage condition, an environment, a situation, and the like. Thus, when exploring all the elements, an unnecessary amount of power may be consumed, and a signal processing efficiency in the digital circuit may decrease.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a data communication device including a data array configured to receive pieces of data, and register cells, each of the registers cells being configured to be activated based on a respective one of the pieces of data. The device further includes an outputter configured to output information corresponding to a register cell that is activated among the register cells.

Each of the register cells may be further configured to receive a selection signal corresponding to the respective one of the pieces of data being present in the data array, from the data array, and a control signal that is synchronized with a clock signal, and in response to the reception of the control signal and the selection signal, be activated.

Each of the register cells may include a path selector configured to select a path including a respective one of the register cells to activate the respective one of the register cells.

Each of the register cells may be further configured to receive a selection signal corresponding to the respective one of the pieces of data being absent in the data array, from the data array, and a control signal that is synchronized with a clock signal, and in response to the reception of the control signal and the selection signal, be inactivated.

Each of the register cells may include a path selector configured to select a path excluding a respective one of the register cells to inactivate the respective one of the register cells.

The device may further include a controller configured to generate a control signal that is synchronized with a clock signal, transmit the control signal to the register cells, receive the control signal passing through the register cells in sequential order, and determine that the data array completes output of the pieces of data, in response to the reception of the control signal.

Each of the register cells may be further configured to transmit an activation signal to the outputter in response to a respective one of the register cells being activated, and the outputter may be further configured to receive the activation signal from the activated respective one of the register cells, and output the information corresponding to the activated respective one of the register cells in response to the reception of the activation signal.

The information may include at least one among an address and one of the pieces of data corresponding to the activated register cell.

Each of the register cells may include a D flip-flop.

The data array may be a set of signal nodes or a memory.

According to an aspect of another example embodiment, there is provided a data communication device including a main state machine configured to request a sub-state machine to read data from an event array receiving sets of data, and sub-state machines, each of the sub-state machines being configured to read respective data from the event array, transmit the read data to the main state machine, and request a subsequent sub-state machine to read data from the event array.

The event array may be classified into groups, and the main state machine may be further configured to receive a selection of a group from the groups, and, in response to the selection of the group, request one of the sub-state machines to read data from the selected group.

Each of the sub-state machines may be further configured to receive a progress request signal from a previous state machine, and read the respective data from the event array in response to the reception of the progress request signal.

Each of the sub-state machines may be further configured to, in response to a presence of the respective data in the event array, transmit information of the read data to the main state machine, and transmit a read-out completion signal to the previous sub-state machine and the main state machine, receive a data acceptance signal from the main state machine in response to the transmission of the read-out completion signal, and transmit another progress request signal to a subsequent sub-state machine in response to the reception of the data acceptance signal.

Each of the sub-state machines may be further configured to, in response to an absence of the respective data in the event array, transmit information indicating the absence of the respective data to the main state machine, and transmit a read-out completion signal to the previous sub-state machine and the main state machine, receive a data acceptance signal from the main state machine in response to the transmission of the read-out completion signal, and transmit another progress request signal to a subsequent sub-state machine in response to the reception of the data acceptance signal.

Each of the sub-state machines may be further configured to receive a read-out initiation signal from a subsequent sub-state machine, and in response to the reception of the read-out initiation signal, enter an idle state.

The main state machine may be further configured to receive a group selection signal indicating a group that is selected from groups of the event array, and in response to the reception of the group selection signal, output an address of the selected group.

The main state machine may be further configured to receive information of the read data from each of the sub-state machines, and information indicating an absence of the respective data from each of the sub-state machines, in response to the reception of at least one among the information of the read data from a sub-state machine among the sub-state machines and the information indicating the absence of the respective data from the sub-state machine, increase a counter, and transmit a data acceptance signal to the sub-state machine, and in response to the reception of the information of the read data from the sub-state machine, asynchronously output the information.

The main state machine may be further configured to determine that the counter is equal to a number of the sub-state machines, and in response to the determination that the counter is equal to the number of the sub-state machines, initialize the counter, and enter an idle state.

According to an aspect of another example embodiment, there is provided a data communication device including a data array configured to receive pieces of data from an event array receiving sets of data, register cells, each of the registers cells being configured to receive, from the data array, a selection signal corresponding to a respective one of the pieces of data, and be activated based on the selection signal. The data communication device further includes an outputter configured to receive an activation signal from a register cell that is activated among the register cells, receive the pieces of data from the data array, and output a piece of data corresponding to the activated register cell among the pieces of data.

BRIEF DESCRIPTION OF THE DRAWINGS

The above and other aspects be more apparent and more readily appreciated from the following detailed description of example embodiments with reference to the accompanying drawings of which.

DETAILED DESCRIPTION

Figure 1:
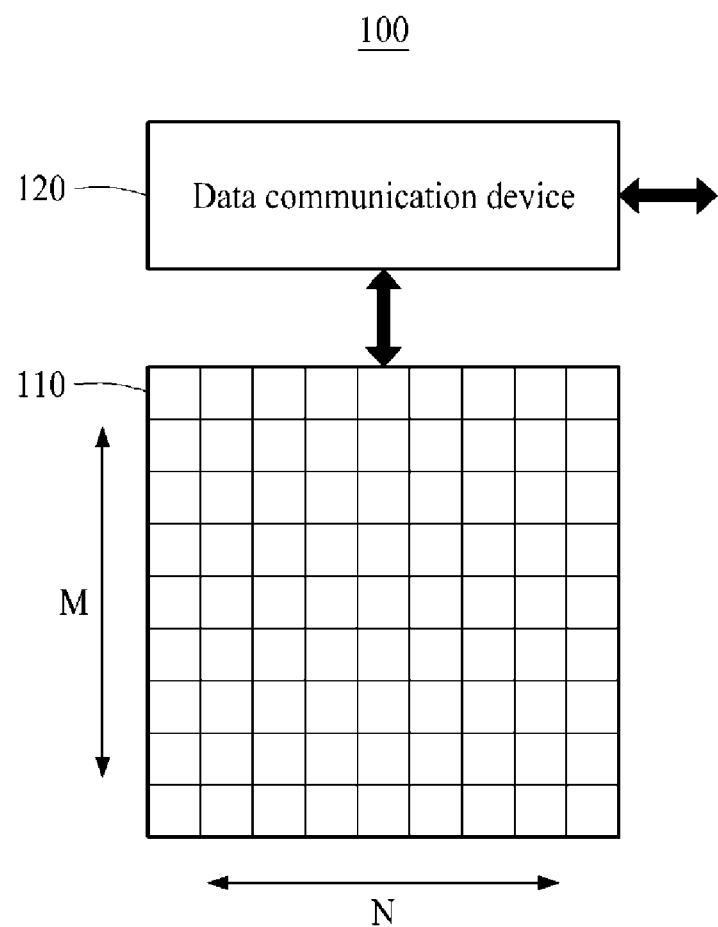
FIG. 1 is a diagram illustrating a data communication system according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

The terminology used herein is for the purpose of describing the example embodiments only and is not intended to be limiting of the disclosure. As used herein, the singular forms "a," "an," and "the" are intended to include the plural forms as well, unless the context clearly indicates otherwise. It will be further understood that the terms "include/comprise" and/or "have," when used in this disclosure, specify the presence of stated features, integers, steps, operations, elements, components, or combinations thereof, but do not preclude the presence or addition of one or more other features, integers, steps, operations, elements, components, and/or groups thereof. In addition, the terms such as "unit," "-er (-or)," and "module" described in the specification refer to an element for performing at least one function or operation, and may be implemented in hardware, software, or the combination of hardware and software.

FIG. 1 is a diagram illustrating a data communication system 100 according to an example embodiment.

Referring to FIG. 1, the data communication system 100 includes an event array 110 and a data communication device 120.

The event array 110 refers to an array configured to receive a plurality of sets of data. The event array 110 may receive a plurality of sets of data that is generated in response to an occurrence of an event. For example, as illustrated in FIG. 1, the event array 110 includes M elements in a column direction and N elements in a row direction, i.e., elements arranged in an M×N matrix. Here, "N" and "M" denote an integer greater than or equal to 1. An element included in the event array 110 indicates a unit to receive data.

For example, the event array 110 may be an event-based vision sensor. In a case of the event array 110 being the event-based vision sensor, an element may detect occurrence of a predetermined event and output an event signal. Here, the event may include, for example, an event indicating a change in a light intensity. For example, the event may be detected and output by the vision sensor based on an event of capturing an external object. However, the event is not limited to the foregoing examples, and thus the event may include an event indicating a change in various physical, chemical, biological, and electrical elements such as, for example, a sound, an acceleration, and an electrical signal. Also, the event array 110 is not limited to the event-based vision sensor.

The event-based vision sensor may output the event signal asynchronously with time by detecting a change in an intensity of light to be incident. For example, when the event-based vision sensor detects an event of increasing a light intensity in an element, the element may output an ON event. When the event-based vision sensor detects an event of decreasing a light intensity in an element, the element may output an OFF event.

Dissimilar to a frame-based vision sensor, the event-based vision sensor may output an event signal only in an element of a portion having a change in a light intensity, without scanning an output of a photodiode of each pixel by a frame unit. The change in an intensity of light to be incident to the event-based vision sensor may occur due to an external object or a movement of the event-based vision sensor.

For example, when a light source is actually fixed based on a lapse of time and the external object does not emit light by itself, light to be incident to the event-based vision sensor may be light generated from the light source and reflected by the external object. When all of the external object, the light source, and the event-based vision sensor do not move, light to be reflected by the external object that is not moving may not actually change, and thus the change in an intensity of light to be incident to the event-based vision sensor may not occur. Conversely, when the external object moves, light to be reflected by the external object that is moving may change depending on the movement of the external object, and thus the change in an intensity of light to be incident to the event-based vision sensor may occur.

An event signal to be output in response to a movement of the external object may be information generated asynchronously with time and similar to an optic nerve signal to be transferred from a human retina to a human brain. For example, the event signal may not occur in response to a stationary object, but occur only in response to detection of a moving object.

The event-based vision sensor may use only an address and/or time information of an element having a change in an intensity of light, and thus may greatly reduce an amount of information to be processed in comparison to a general image camera.

The data communication device 120 may receive data from the event array 110, and transfer the received data to another device, module, unit, apparatus, and the like. For example, the data communication device 120 may receive asynchronously generated data from the event array 110. According to an example embodiment, the data communication device 120 may effectively receive data from a portion of the event array 110 in which the data is generated without receiving the data from the entirety of the event array 110. The data communication device 120 may encode the received data and transfer the encoded data, or transfer the received data without the encoding.

A detailed configuration and operation of the data communication device 120 will be described hereinafter.

Figure 2:
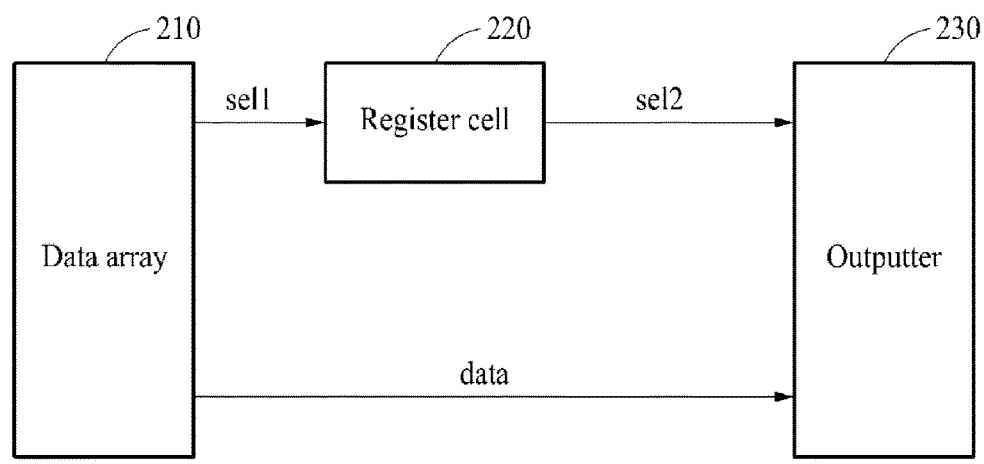
FIG. 2 is a diagram illustrating a schematic structure of a data communication device according to an example embodiment.

FIG. 2 is a diagram illustrating a schematic structure of the data communication device 200 according to an example embodiment.

Referring to FIG. 2, the data communication device 200 includes a data array 210, a register cell 220, and an outputter 230.

The data array 210 may receive a plurality of sets of data from an event array. An element of the event array may be classified into a plurality of groups, and the data array 210 may receive data of an element corresponding to a group selected from the plurality of groups. For example, an element of the event array may be classified by a row unit, and classified into M rows as illustrated in FIG. 1. The data array 210 may receive, from the event array, data corresponding to one row among the M rows.

The data array 210 transfers the received data to the register cell 220 and the outputter 230. The data array 210 may maintain the received data until a series of operations for the received data is completed. For example, the data array 210 may be a set of signal nodes or memories. The data array 210 may include N signal nodes or N memories, and receive N pieces of data corresponding to the selected group, for example, the one selected row of the event array of FIG. 1, through respective signal nodes or memories.

The register cell 220 may be a plurality of register cells, for example, N register cells. Each register cell may determine whether to be activated based on the received data. For example, a register cell of the register cell 220 receives data to be transferred from the data array 210 as a selection signal sel1, and activates the register cell based on the selection signal sel1. In addition, in response to the register cell being activated, the register cell transfers an activation signal sel2 to the outputter 230.

In response to reception of the activation signal sel2 from the activated register cell of the register cell 220, the outputter 230 may output information corresponding to the activated register cell. For example, the outputter 230 may output the information corresponding to the activated register cell based on the activation signal sel2 received from the activated register cell and the data received from the data array 210. The outputter 230 may output at least one among an address corresponding to the activated register cell and the data received from the data array 210.

According to an example embodiment, in a case that a location in the event array at which data is generated, for example, an address of an element in which the data is generated, changes frequently, the data communication device 200 may effectively receive the data by reconfiguring the register cell 220 that is a plurality of register cells. The data communication device 200 may be provided in a form of a chip, and provided in a cellular phone, a camera, a television (TV), and the like.

Thus, the data communication device 200 may reduce an amount of processing time used in an arbiter, reduce power consumption, and facilitate designing by using the register cell that is a plurality of register cells reconfigurable for the event array.

Figure 3:
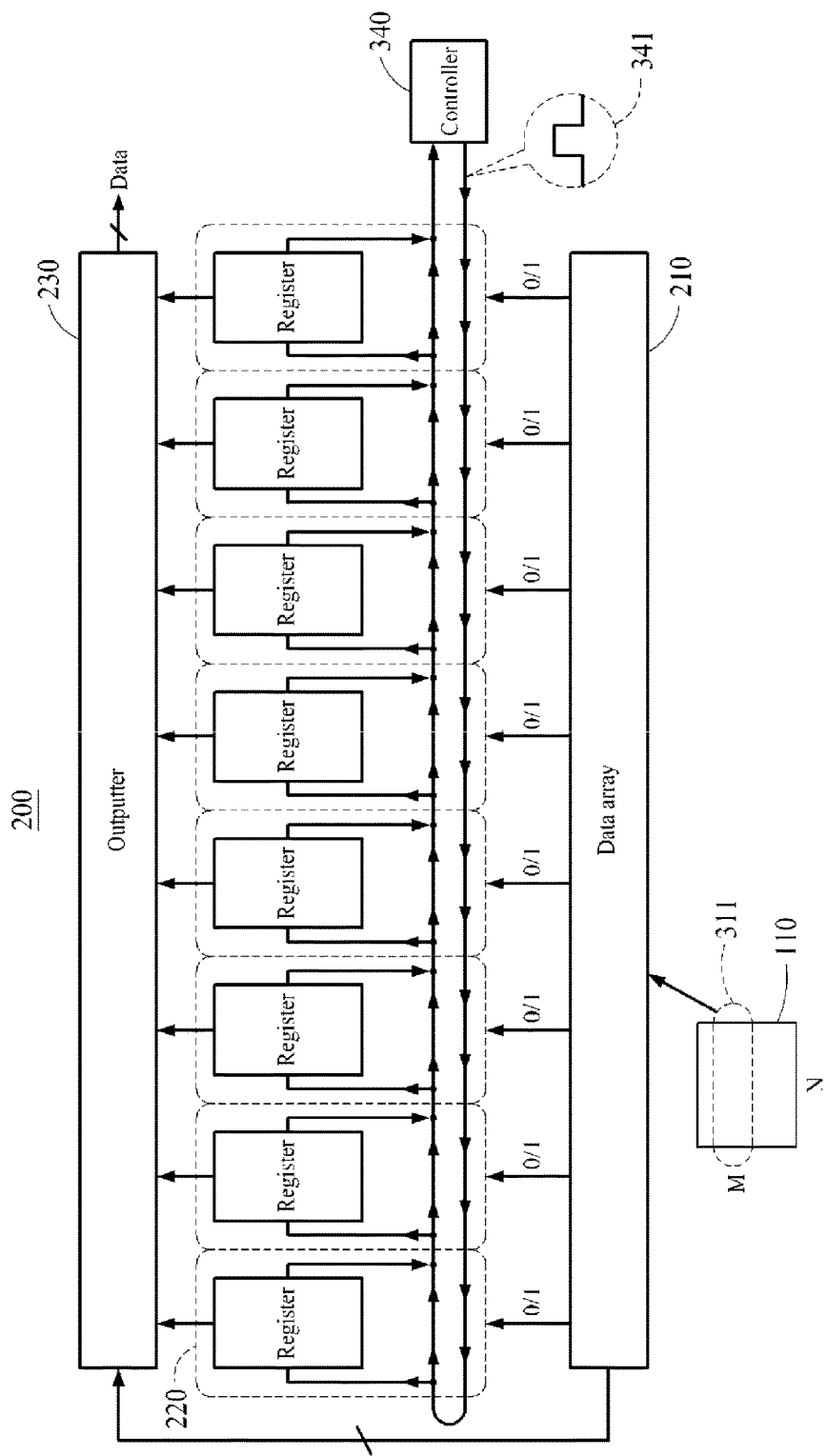
FIG. 3 is a diagram illustrating a detailed structure of a data communication device according to an example embodiment.

FIG. 3 is a diagram illustrating a detailed structure of the data communication device 200 according to an example embodiment.

Referring to FIG. 3, the data communication device 200 includes the data array 210, the register cell 220, and the outputter 230, and further includes a controller 340.

The data array 210 receives a set of data from the event array 110 of FIG. 1. For example, as described above, the data array 210 receives data 311 corresponding to one row among M rows of the event array 110. The data array 210 transfers the data 311 received from the event array 110 as a selection signal, for example, sel1 as illustrated in FIG. 2, in a digital form, for example, 0 or 1 as illustrated in FIG. 3. The data array 210 may also transfer the data 311 to the outputter 230.

The controller 340 generates a control signal 341 and transfers the generated control signal 341 to the register cell 220 that is a plurality of register cells. The control signal 341 is a signal synchronized with a clock signal, and may instruct each register cell to initiate an operation. The control signal 341 may be transferred along a path selected by each register cell. When the controller 340 receives the control signal 341 that passed through the register cell 220 in sequential order, the controller 340 may determine that the data array 210 completes outputting data corresponding to a selected group, for example, the selected row. Subsequently, the controller 340 may select a subsequent group from the event array 110, and control the event array 110 to transfer data corresponding to the selected subsequent group to the data array 210.

The register cell 220 may operate based on a sequential order in which the control signal 341 generated by the controller 340 is transferred. For example, as illustrated in FIG. 3, the register cell 220 may operate in order from left to right.

When a register cell of the register cell 220 receives the control signal 341 generated by the controller 340, the register cell may determine whether to be activated. In response to the reception of the control signal 341 synchronized with the clock signal, the register cell of the register cell 220 may be activated when data corresponding to the register cell is present in the data array 210, for example, when a value to be input to the register cell from the data array 210 is 1. Conversely, the register cell may be inactivated when data corresponding to the register cell is absent from the data array 210, for example, when a value to be input to the register cell from the data array 210 is 0. When the register cell of the register cell 220 is activated, the register cell transfers an activation signal, for example, sel2 as illustrated in FIG. 2, to the outputter 230. A detailed description of activation and inactivation of each of the register cell 220 will be provided with reference to FIGS. 4A, 4B, and 4C.

The outputter 230 may determine information to be output based on an activation signal received from each of the register cell 220 and data received from the data array 210. For example, when an activation signal is received from a register cell of the register cell 220, the outputter 230 may output information corresponding to the register cell, for example, an address of the register cell or data received by the register cell from the data array 210, at a point in time at which the control signal 341 is input to the register cell.

However, data to be received by the data array 210 and transferred to the outputter 230 is not limited to a form of 0 or 1 as described in the foregoing, and the data may be data indicating information. For example, data to be received by the data array 210 may be indicated as A1 through AK indicating K states, wherein "K" denotes an integer greater than or equal to 1. The outputter 230 may include a data line corresponding to each of $A_1$ through $A_K$. When an activation signal is transferred from an i-th register cell among the register cell 220, wherein "i" denotes an integer greater than or equal to 1 and less than or equal to N, and information corresponding to the i-th register cell is $A_j$, wherein the subscript "j" denotes an integer greater than or equal to 1 and less than or equal to K, the outputter 230 may allocate a value of 1 to a data line corresponding to $A_j$ and output the data line to which the value of 1 is allocated. Thus, the outputter 230 may output information indicating that $A_3$ is received by an i-th element in a selected row of the event array 110. In a case of the event array 110 being an event-based vision sensor, K may be 2, and $A_1$ and $A_2$ may be an ON event and an OFF event, respectively. Although an example of K being 1 is described in the foregoing, the value of K is not limited thereto.

Figure 4A:
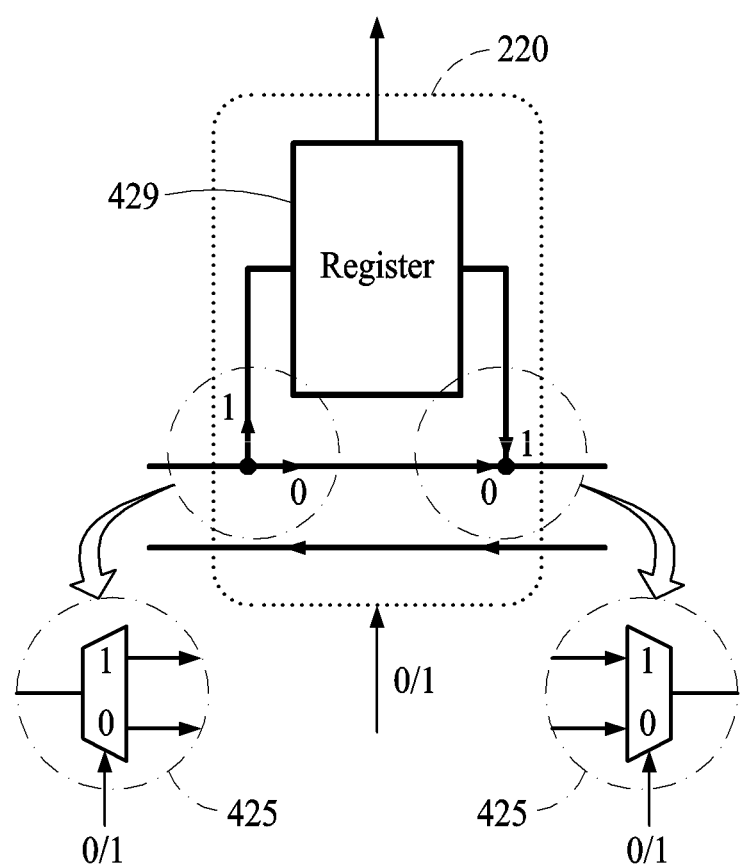
FIGS. 4A, 4B, and 4C are diagrams illustrating a structure of a register cell according to an example embodiment.
Figure 4B:
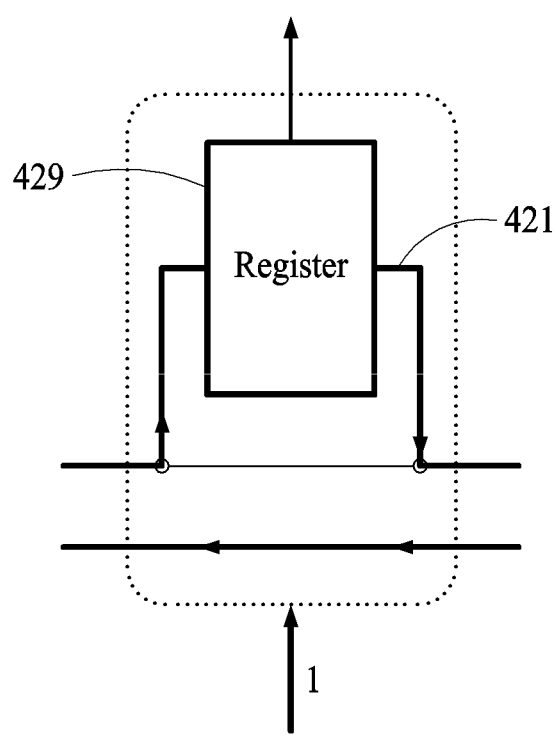
Figure 4C:
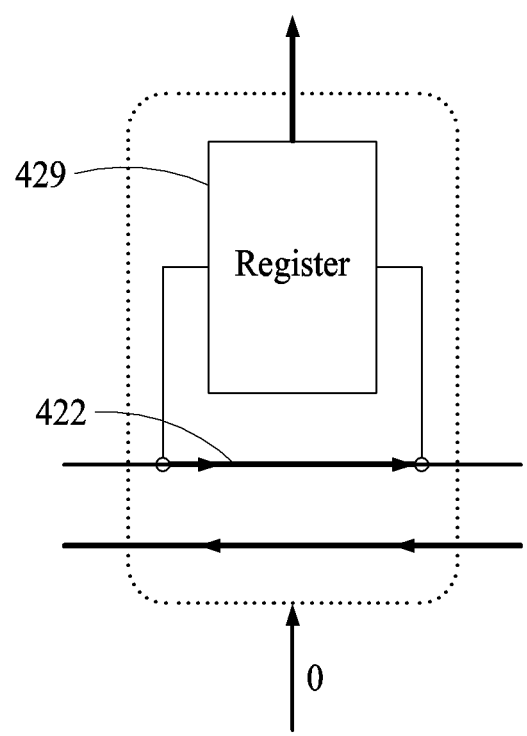

FIGS. 4A, 4B, and 4C are diagrams illustrating a structure of the register cell 220 according to an example embodiment.

FIG. 4A illustrates a structure of the register cell 220. Referring to FIGS. 4A through 4C, the register cell 220 includes a register 429 and a path selector 425.

The path selector 425 may select a path based on data received from a data array. For example, as illustrated in FIG. 4A, the path selector 425 receives the data from the data array as a selection signal, for example, sel1 as illustrated in FIG. 2, in a form of 0 or 1. Here, the path selector 425 may include a multiplexer (MUX), but is not limited thereto. The path selector 425 may include, for example, all devices, circuits, and modules that may change a path through which a control signal passes based on a value of the selection signal to be received from the data array.

FIG. 4B illustrates an example of the register cell 220 being activated. For example, the path selector 425 activates the register cell 220 by selecting a path 421 including the register 429. When a value of the selection signal is 1, the path selector 425 transfers the control signal to the register 429. When the control signal is input to the register 429, the register 429 generates an activation signal. For example, the register 429 may store the control signal during at least one clock, and maintain a value of the activation signal to be transferred to an outputter to be 1 while the control signal is being stored. The register cell 220 transfers the control signal that passed through the register 429 to a subsequent register cell or a controller.

FIG. 4C illustrates an example of the register cell 220 being inactivated. For example, the path selector 425 inactivates the register cell 220 by selecting a path 422 excluding the register 429. When a value of the selection signal is 0, the path selector 425 transfers the control signal to the subsequent register cell or the controller. As illustrated in FIG. 4C, because the control signal is not input to the register 429, the register cell 220 may maintain the value of the activation signal to be transferred to the outputter to be 0.

Figure 5:
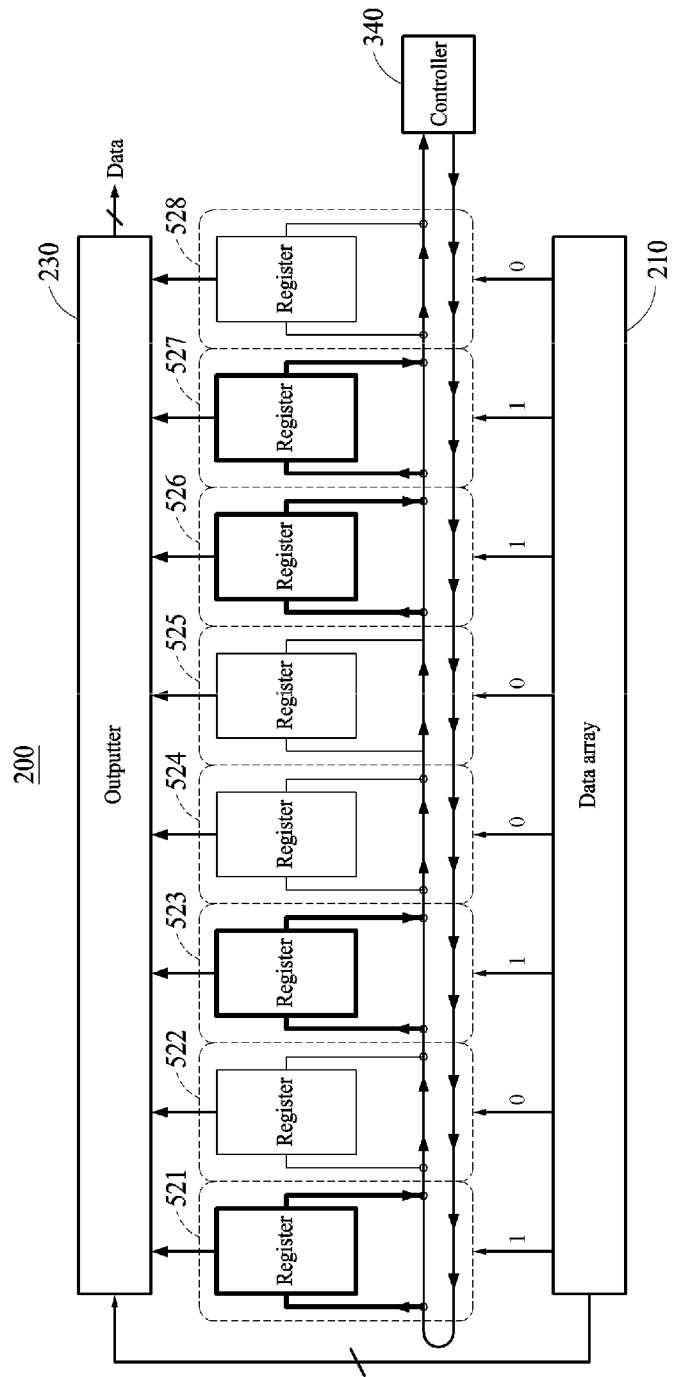
FIG. 5 is a diagram illustrating a configuration of a data communication device according to an example embodiment.

FIG. 5 is a diagram illustrating a configuration of the data communication device 200 according to an example embodiment.

In FIG. 5, it is assumed that the data communication device 200 includes a total of eight register cells, for example, a first register cell 521, a second register cell 522, a third register cell 523, a fourth register cell 524, a fifth register cell 525, a sixth register cell 526, a seventh register cell 527, and an eighth register cell 528. However, the number of register cells is not limited to the aforementioned example, and may vary depending on a design.

Referring to FIG. 5, the data array 210 transfers data of 1, 0, 1, 0, 0, 1, 1, and 0 to the first through eighth register cells 521 through 528. Based on respective data, the first register cell 521, the third register cell 523, the sixth register cell 526, and the seventh register cell 527 are activated, and the second register cell 522, the fourth register cell 524, the fifth register cell 525, and the eighth register cell 528 are inactivated.

The controller 340 generates a control signal, and transfers the control signal to the first register cell 521. Because a path including a register is activated when the control signal is received, the first register cell 521 transfers an activation signal to an outputter 230. The outputter 230 may output data corresponding to the first register cell 521 at a clock at which the activation signal is received. The outputter 230 may output an address of the first register cell 521, for example, 000, and 1 that is data allocated to the first register cell 521. Subsequently, the first register cell 521 passes the control signal to the second register cell 522.

Because the second register cell 522 is inactivated, the second register cell 522 transfers the control signal to the third register cell 523 without outputting a signal.

Because the third register cell 523 is activated, the third register cell 523 may perform an operation similar to the aforementioned operation performed by the first register cell 521. For example, the third register cell 523 may output an address corresponding to the third register cell 523, for example, 010, and data, for example, 1, at a clock at which the control signal is received. Here, because the control signal is immediately transferred from the second register cell 522 without consumption of a clock, the outputter 230 may output information corresponding to the third register cell 523 at a clock immediately subsequent to the clock at which the information corresponding to the first register cell 521 is output, in response to an activation signal transferred from the third register cell 523.

Because the forth register cell 524 and the fifth cell 525 are inactivated similarly to the second register cell 522, the control signal is transferred to the sixth register cell 526 without outputting a signal.

The sixth register cell 526 and the seventh register cell 527 may operate similarly to the third register cell 523, and the outputter 230 may output information corresponding to the sixth register cell 526 at a clock subsequent to the clock at which the information corresponding to the third register cell 523 is output, and output information corresponding to the seventh register cell 527 at a clock subsequent to the clock at which the information corresponding to the sixth register cell 526 is output.

Because the eighth register cell 528 is inactivated, the control signal is transferred to the controller 340 without outputting a signal, and the controller 340 may determine that all pieces of data received by the data array 210 are output. The controller 340 may control an event array to transfer, to the data array 210, data corresponding to a subsequent group, for example, a subsequent row, of the event array.

According to an example embodiment, despite a clock-based operation, the data communication device 200 may inactivate a register cell corresponding to an element in which data is not generated and activate only a register cell corresponding to an element in which data is generated, and thus may output data at each clock. Thus, the data communication device 200 may output values of the data array 210 more effectively and rapidly.

Such operation of the data communication device 200 of FIG. 5 is provided as an illustrative example only, and thus the number of register cells, a type of data, and a progress order of a control signal in which the control signal is transferred are not be limited to the description provided with reference to FIG. 5. For example, the number of register cells may be N, the type of data may be $A_1$ through $A_K$, and the progress order of the control signal may be from right to left.

Figure 6:
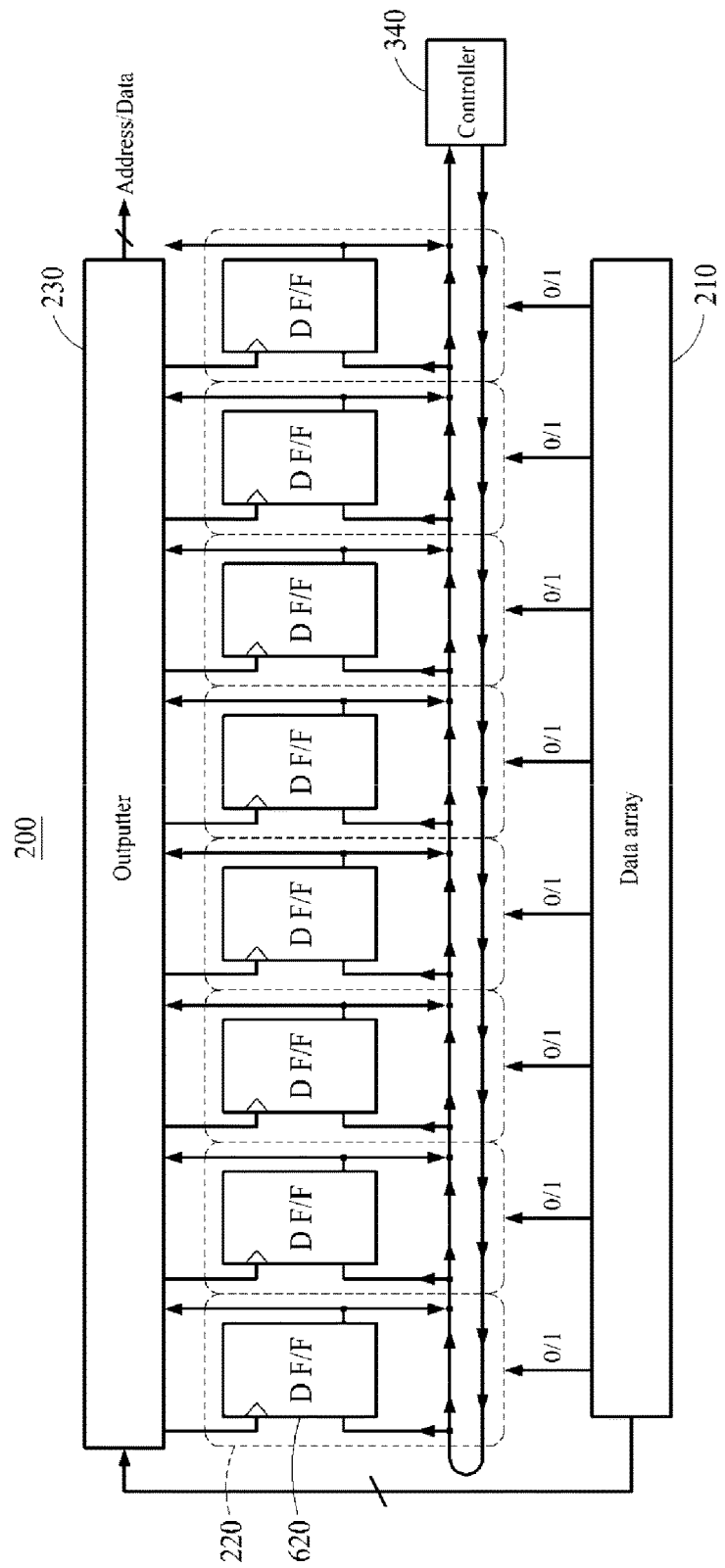
FIG. 6 is a diagram illustrating a structure of a register cell included in a data communication device according to an example embodiment.

FIG. 6 is a diagram illustrating a structure of the register cell 200 included in the data communication device 200 according to an example embodiment.

FIG. 6 illustrates an example of a register in the register cell 200 being configured as a D flip-flop (D F/F) 620. The D flip-flop 620 may operate based on a clock signal (CLK), and transfer a control signal synchronized with the clock signal to an outputter 230 as an activation signal. However, the register is not limited to an example illustrated in FIG. 6, and thus the register may be configured as an asynchronous circuit using a handshaking protocol. For other remaining components of the data communication device 200, reference may be made to the descriptions provided with reference to FIGS. 1 through 5, and a repeated description will be omitted here.

Figure 7:
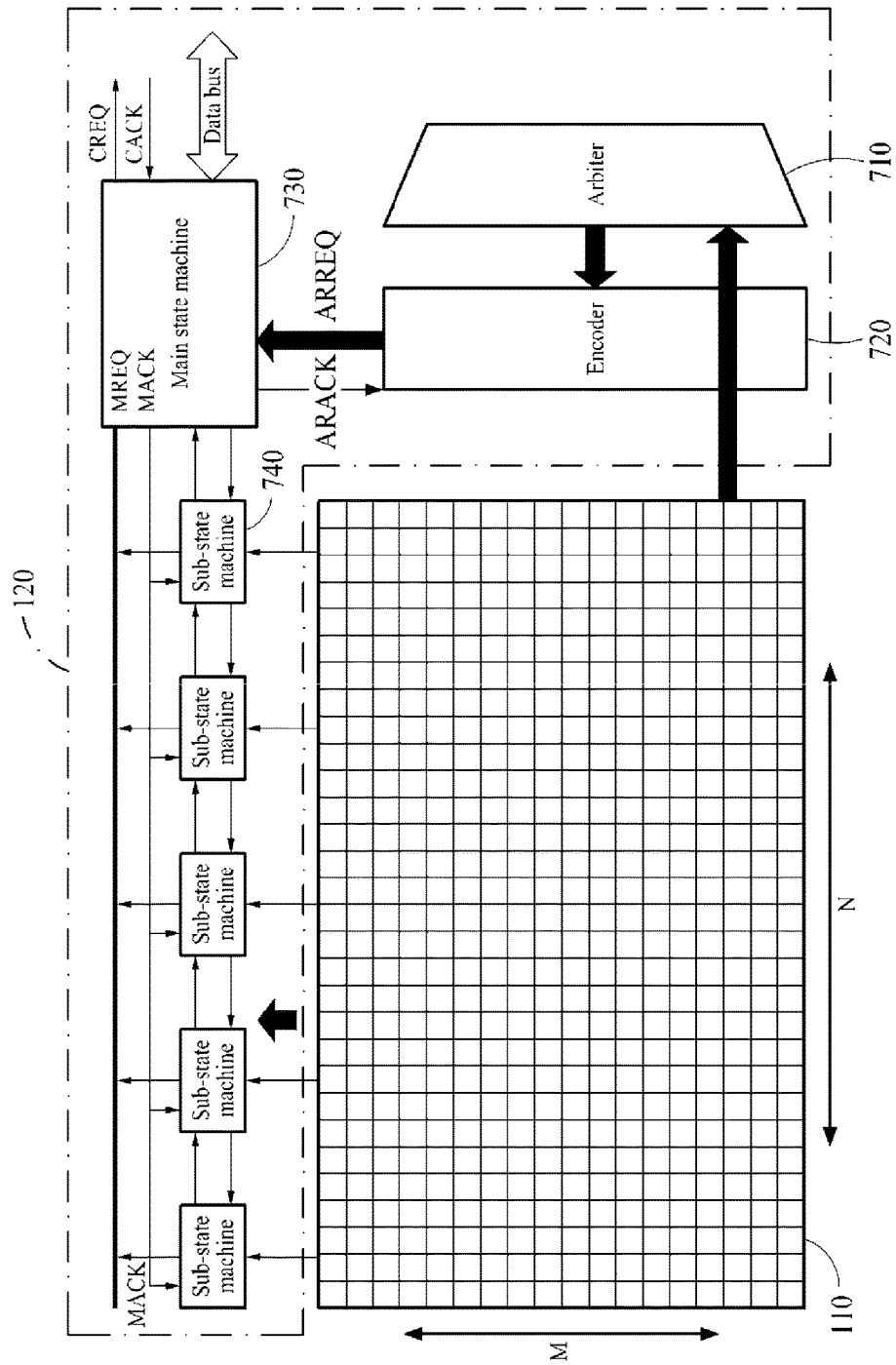
FIG. 7 is a diagram illustrating a configuration of a data communication device according to another example embodiment.

FIG. 7 is a diagram illustrating a configuration of the data communication device 120 according to another example embodiment.

The data communication device 120 illustrated in FIG. 7 receives data from the event array 110, externally outputs the received data, and may be configured differently from the configuration of the data communication device 200 illustrated in FIGS. 2 through 6.

Referring to FIG. 7, an arbiter 710 may select a group from the event array 110 that is classified into a plurality of groups. For example, the plurality of groups may be M rows as illustrated in FIG. 7. The arbiter 710 may select one row. In addition, the arbiter 710 may select a subsequent group, for example, a subsequent row, after data corresponding to the selected group is read out.

An encoder 720 may encode an address corresponding to the group selected by the arbiter 710, and transfer the encoded address to a main state machine 730. For example, the encoder 720 may transfer, to the main state machine 730, an address of the selected row. In addition, the encoder 720 transfers, to the main state machine 730, a group selection signal, for example, ARREQ, to request the main state machine 730 to read out the data corresponding to the group selected by the arbiter 710. After the data corresponding to the group is read out, the encoder 720 receives a group read-out completion signal, for example, ARACK, from the main state machine 730, and may transfer the received signal to the arbiter 710.

The main state machine 730 may read the data corresponding to the group selected by the arbiter 710 from the event array 110 by controlling a sub-state machine 740. For example, the main state machine 730 may request the sub-state machine 740 to read out the data from the event array 110. In addition, in response to reception of the group selection signal ARREQ, the main state machine 730 may output the address corresponding to the selected group of the event array 110. Each time the sub-state machine 740 reads out data, the main state machine 730 transfers a data output signal, for example, CREQ, to another device, module, unit, and apparatus, while outputting the data through a data bus, and receives a data acceptance signal, for example, CACK, from the other device, module, unit, and apparatus. The main state machine 730 may include a logic circuit to perform operations to be described with reference to FIG. 8.

The sub-state machine 740 may read out the data from the event array 110 and transfer the read data to the main state machine 730, and request a subsequent sub-state machine to read out data from the event array 110. The sub-state machine 740 may include a logic circuit to perform operations to be described with reference to FIGS. 9 and 10.

Figure 8:
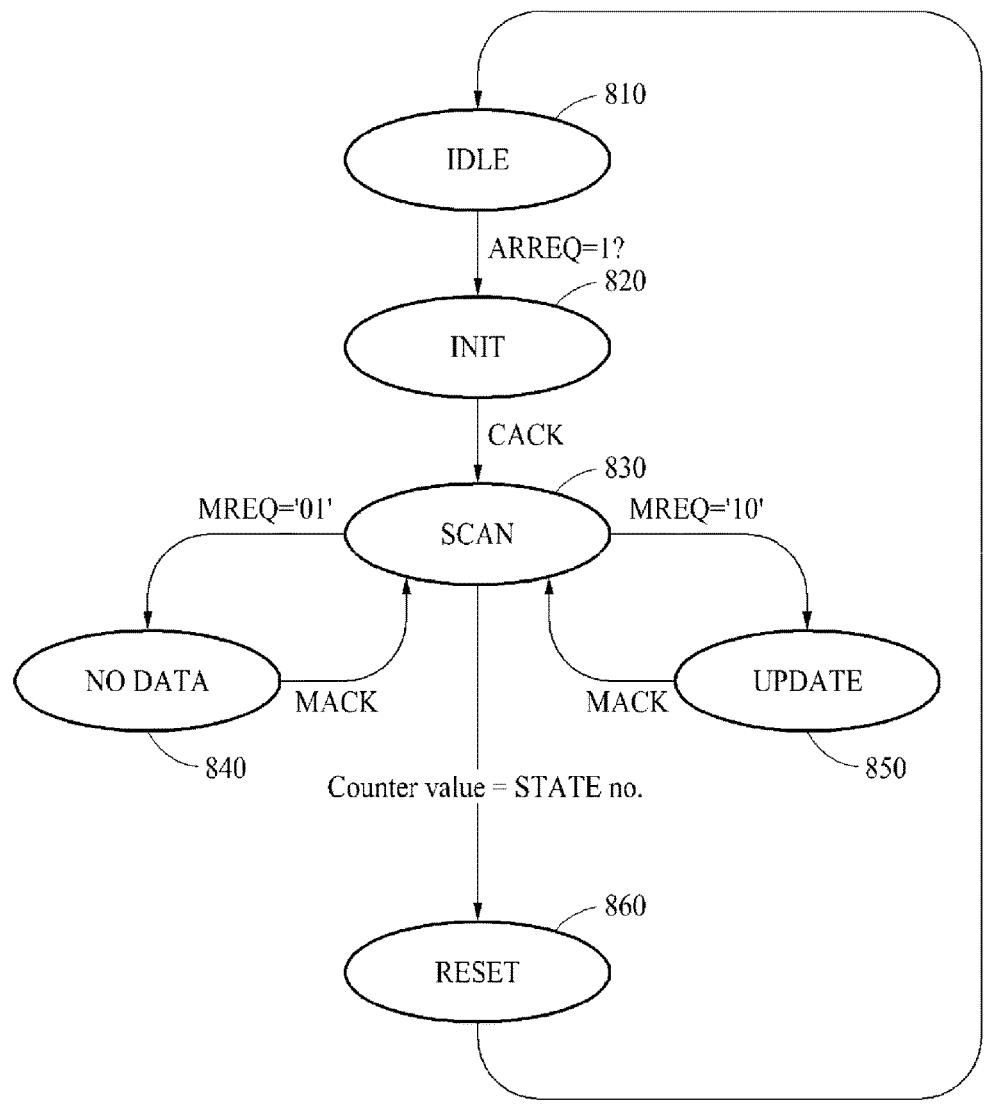
FIG. 8 is a diagram illustrating a state transition of a main state machine according to an example embodiment.

FIG. 8 is a diagram illustrating a state transition of the main state machine 730 according to an example embodiment.

Referring to FIG. 8, in an IDLE state 810, the main state machine 730 may wait for the arbiter 710 to select a group. For example, when the arbiter 710 selects a group, the main state machine 730 receives a request to read out data corresponding to the selected group, for example, a group read-out request signal, for example, ARREQ to which 1 is allocated, and enters an INIT state 820.

In the INIT state 820, in response to reception of a data acceptance signal, for example, CACK, from another device, module, unit, and apparatus, the main state machine 730 enters a SCAN state 830 to read out subsequent data. In response to the group being selected from a plurality of groups in the IDLE state 810, the main state machine 730 may request the sub-state machine 740 to read out the data from a portion corresponding to the selected group in the event array 110 in the INIT state 820.

In response to reception of information, for example, MREQ='10,' corresponding to the data read out by the sub-state machine 740 or information, for example, MREQ='01,' indicating absence of the data, from the sub-state machine 740 among a plurality of sub-state machines, the main state machine 730 may increase a counter and transfers a data acceptance signal, for example, MACK, to the sub-state machine 740. In addition, in response to reception of the information MREQ='10' corresponding to the data read out by the sub-state machine 740, the main state machine 730 may asynchronously output the information MREQ='10' through a data bus. A detailed state transition of the main state machine 730 will be described hereinafter.

For example, in the SCAN state 830, the main state machine 730 receives the information MREQ from the sub-state machine 740. For example, when the main state machine 730 receives MREQ='01,' the main state machine 730 enters a NO DATA state 840. When the main state machine 730 receives MREQ='10,' the main state machine 730 enters an UPDATE state 850. However, a value of MREQ is provided as an illustrative example only, and thus a bit and a value of MREQ may vary depending on a design. Here, MREQ='01' indicates the information indicating the absence of data, and MREQ='10' indicates the information corresponding to the data read out by the sub-state machine 740.

In the NO DATA state 840, the main state machine 730 may increase the counter. Subsequently, the main state machine 730 transfers the data acceptance signal MACK to the sub-state machine 740. The main state machine 730 then returns to the SCAN state 830 to scan data transmission from a subsequent sub-state machine.

In the UPDATE state 850, the main state machine 730 may increase the counter, and transfers the data acceptance signal MACK to the sub-state machine 740. Further, in response to reception of the information MREQ='10' corresponding to the data read out by the sub-state machine 740, the main state machine 730 may asynchronously output the information MREQ='10' along with a data output signal, for example, CREQ. The main state machine 730 then returns to the SCAN state 830 to scan data transmission from a subsequent sub-state machine.

When a value of the increased counter is equal to the number of sub-state machines (STATE no.) in the SCAN state 830, the main state machine 730 enters a RESET state 860. Here, the value of the counter indicates the number of attempts to read out data from a selected group, and the main state machine 730 may enter the RESET state 860 when such attempts to read out data by all the sub-state machines are completed.

In the RESET state 860, in response to the value of the counter being equal to the number of the sub-state machines, the main state machine 730 may initialize the value of the counter and enters the IDLE state 810. For example, the main state machine 730 may set the value of the counter to be 0, and enters the IDLE state 810.

The main state machine 730 may include a logic circuit to perform the operations described with reference to FIG. 8. However, a configuration of the main state machine 730 is not limited thereto, and thus the main state machine 730 may be embodied as various hardware components, software components, and/or combinations thereof.

Figure 9:
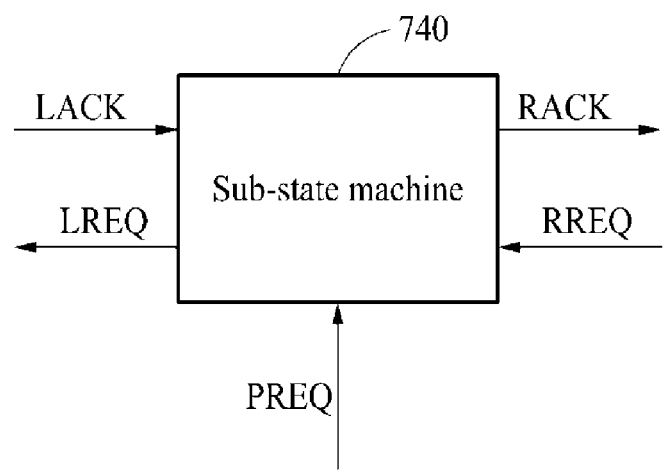
FIG. 9 is a diagram illustrating a sub-state machine of a data communication device according to an example embodiment.
Figure 10:
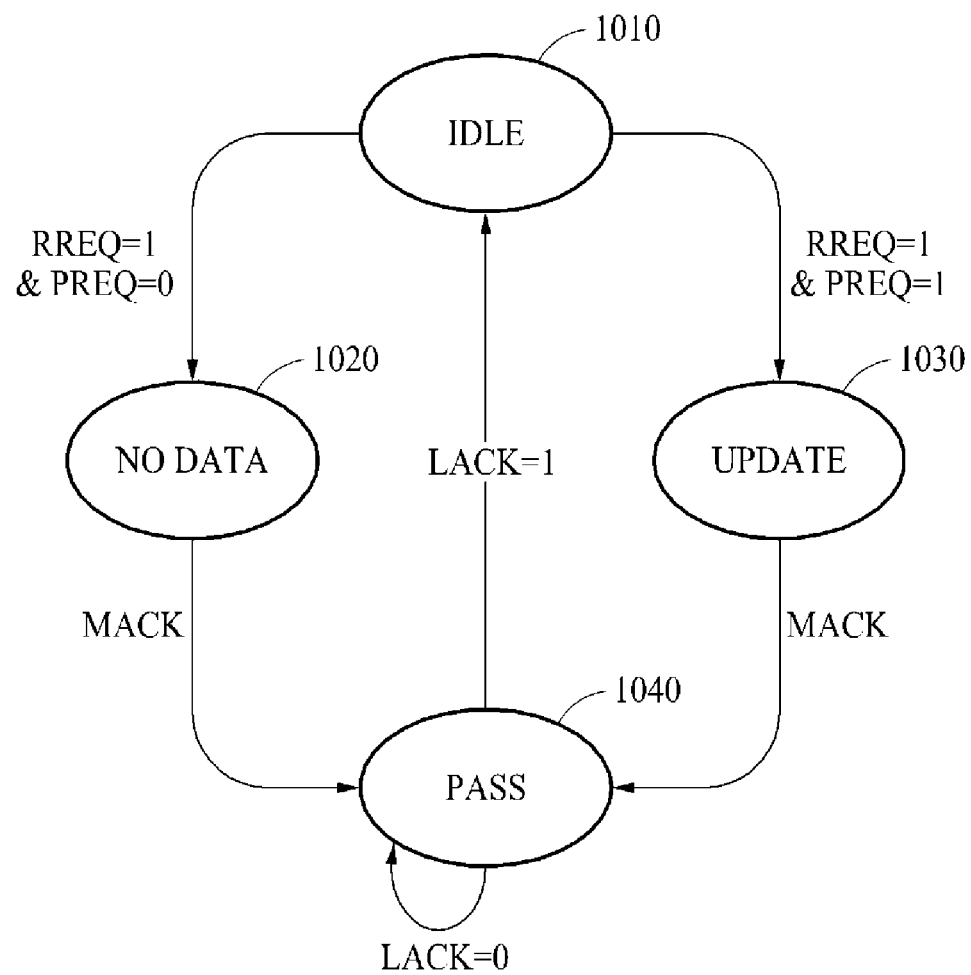
FIG. 10 is a diagram illustrating a state transition of a sub-state machine according to an example embodiment.

FIG. 9 is a diagram illustrating the sub-state machine 740 of the data communication device 120 according to an example embodiment, and FIG. 10 is a diagram illustrating a state transition of the sub-state machine 740 according to an example embodiment.

A signal to be output from and input to each sub-state machine, for example, the sub-state machine 740 illustrated in FIG. 9, will be described based on the sub-state machine 740 as a reference. For example, referring to FIG. 9, "LACK" may be received as "RACK" by a sub-state machine disposed in a left side of the sub-state machine 740. "PREQ" indicates data to be received from an event array, and "RREQ" indicates a request signal to be received from a right side. "LACK" indicates an acceptance signal to be received from the left side, and "RACK" indicates an acceptance signal to be transferred by the sub-state machine 740 to the right side. "LREQ" indicates a request signal to be transferred by the sub-state machine 740 to the left side.

Referring to FIG. 10, in an IDLE state 1010, each of a plurality of sub-state machines, for example, the sub-state machine 740, may transfer information indicating the IDLE state 1010, for example, MREQ='00,' to the main state machine 730. In the IDLE state 1010, the sub-state machine 740 may initialize a value of signals to be transferred to another machine, for example, RACK and LREQ, to be 0. In response to reception of a progress request signal, for example, RREQ=1, from a previous state machine, for example, a sub-state machine disposed in a right side of the sub-state machine 740 as illustrated in FIG. 7 or the main state machine 730 (although not limited thereto), the sub-state machine 740 may read out data from the event array.

When data corresponding to the sub-state machine 740 is absent from the event array, for example, PREQ=0, the sub-state machine 740 enters a NO DATA state 1020. In the NO DATA state 1020, the sub-state machine 740 may transfer, to the main state machine 730, information indicating the absence of the data, for example, MREQ='01.' The sub-state machine 740 may transfer a read-out completion signal, for example, MREQ, to the main state machine 730 and a read-out completion signal, for example, RACK, to a previous sub-state machine, for example, the sub-state machine disposed in the right side as illustrated in FIG. 7, and receives a data acceptance signal, for example, MACK, from the main state machine 730. The sub-state machine 740 may then transfer a progress request signal, for example, LREQ, to a subsequent sub-state machine.

When the data corresponding to the sub-state machine 740 is present in the event array, for example, PREQ=1, the sub-state machine 740 enters an UPDATE state 1030. In the UPDATE state 1030, the sub-state machine 740 may transfer, to the main state machine 730, information corresponding to the read data, for example, MREQ='10.' The sub-state machine 740 may transfer the read-out completion signal RACK to the previous sub-state machine and transfer the read-out completion signal MREQ to the main state machine 730. The sub-state machine 740 receives the data acceptance signal MACK from the main state machine 730, and then transfer the progress request signal LREQ to the subsequent sub-state machine.

The sub-state machine 740 enters a PASS state 1040. In the PASS state 1040, the sub-state machine 740 may transfer the progress request signal LREQ to the subsequent sub-state machine. When a read-out initiation signal, for example, LACK, is not received from the subsequent sub-state machine, for example, LACK=0, the sub-state machine 740 stands by in the PASS state 1040. When the read-out initiation signal LACK is received from the subsequent sub-state machine, for example, LACK=1, the sub-sate machine 740 enters the IDLE state 1010.

According to an example embodiment, the main state machine 730 and the sub-state machine 740 may asynchronously read out data generated from the event array, and thus hardware resources used to read out data from the event array may be reduced. For example, a silicon region may be minimized because a data communication device described herein applies an arbiter and an encoder only to a row of the event array, and an amount of power consumption may be reduced because a size of the encoder decreases.

According to an example embodiment, a counter precision may be determined based on the number of pixels, for example, N pixels, in one row of the event array. For example, in the data communication device 120 of FIG. 7, N pixels are present in one row, and thus a counter precision may be minimized to be ($\log_2$ N+1) bits. In addition, the number of sub-state machines may be one per column, and thus N sub-state machines may be present in the data communication device 120 of FIG. 7.

In addition, the example embodiments may also be implemented through computer-readable code and/or instructions on a medium, e.g., a computer-readable medium, to control at least one processing element to implement any of the above-described example embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to example embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A data communication device comprising:
   a plurality of signal nodes or memories implementing a data array configured to receive pieces of data;
   a plurality of registers;
   a plurality of circuits implementing a plurality of path selectors, each of the plurality of path selectors being configured to:
      receive, from the plurality of signal nodes or memories, a respective one of the pieces of data;
      based on the received respective one of the pieces of data having a first value, select a first path along which a respective one of the plurality of registers is disposed; and
      based on the received respective one of the pieces of data having a second value, select a second path along which the respective one of the plurality of registers is not disposed,
   wherein the respective one of the plurality of registers is configured to:
      based on the first path being selected, receive a control signal from the selected first path; and
      based on the control signal being received, generate an activation signal; and
   a processor configured to:
      receive the generated activation signal from the respective one of the plurality of registers; and
      output information corresponding to the received activation signal.

2. The device of claim 1, wherein the control signal is synchronized with a clock signal.

3. The device of claim 1, wherein the plurality of path selectors includes multiplexers.

4. The device of claim 1, wherein the respective one of the plurality of registers is further configured to, based on the second path being selected, be inactivated.

5. The device of claim 1, further comprising a controller circuit configured to:
   generate the control signal that is synchronized with a clock signal;
   transmit the control signal to the plurality of path selectors;
   receive the control signal passing through the plurality of path selectors in sequential order; and
   based on the control signal being received, determine that the plurality of signal nodes or memories completes output of the pieces of data.

6. The device of claim 1, wherein each register the plurality of registers is further configured to, based on the control signal being received, transmit the activation signal to the processor, and
   the processor is further configured to receive the transmitted activation signal from the plurality of registers.

7. The device of claim 1, wherein the information comprises either one or both of an address and one of the pieces of data corresponding to the respective one of the plurality of registers.

8. The device of claim 1, wherein each of the plurality of registers comprises a D flip-flop.

9. A data communication device comprising:
   a plurality of signal nodes or memories implementing a data array configured to receive pieces of data from an event array receiving sets of data;
   a plurality of registers;
   a plurality of multiplexers implementing a plurality of path selectors, each of the plurality of path selectors being configured to:
      receive, from the plurality of signal nodes or memories, a respective one of the pieces of data of a selection signal;
      based on the received respective one of the pieces of data having a first value, select a first path along which a respective one of the plurality of registers is disposed; and
      based on the received respective one of the pieces of data having a second value, select a second path along which the respective one of the plurality of registers is not disposed,
   wherein the respective one of the plurality of registers is configured to:
      based on the first path being selected, receive a control signal from the selected first path; and
      based on the control signal being received, generate an activation signal; and
   a processor implementing an outputter configured to:
      receive the generated activation signal from the respective one of the plurality of registers;
      receive the pieces of data from the plurality of signal nodes or memories; and output the received respective one of the pieces of data corresponding to the generated activation signal.

* * * * *